Jan. 5, 1971            M. WAYNE            3,552,029

COMPASS

Filed Feb. 5, 1968

INVENTOR
MARK WAYNE

BY Hauke, Gifford & Patalidis

ATTORNEYS 3,552,029
COMPASS
Mark Wayne, 15530 Thatcher, Detroit, Mich. 48535
Filed Feb. 5, 1968, Ser. No. 703,090
Int. Cl. G01c 23/00, 17/00
U.S. Cl. 33—222                                    8 Claims

ABSTRACT OF THE DISCLOSURE

A compass having a direction of travel indicator mounted thereto above the magnetic needle and selectively rotatable to a position indicating the direction of travel. The indicator includes a pointer graduated along its length in portions of time and a member is slidable along the length of the pointer to a position indicating elapsed time. A resilient washer underlies the pointer, and the pointer and index member can be retained in a set position by the pressure of a cover or clip member applied over the top of the compass.

BACKGROUND OF THE INVENTION

(1) Field of the invention

The present invention relates to direction indicating compasses and more particularly to a direction of travel indicator for such compasses and including means on the indicator for indicating time.

(2) Description of the prior art

Although direction of travel indicators have heretofore been provided for direction indicating compasses, such indicators have been an integral part of the compass structure itself and to my knowledge such an indicator has not been heretofore provided as an assembly which could be readily attached to existing compass structures. Further, such direction of travel indicators have not heretofore included means for indicating the time spent in traveling.

SUMMARY OF THE PRESENT INVENTION

The present invention provides a direction of travel indicator adapted to be readily mounted to existing compass structures and includes a pointer having a member slidable along a scale thereon disposed above the magnetic needle of the compass and rotatable about substantially the same axis as the magnetic needle but independent thereof so that the pointer can be rotated to a position which indicates the direction of travel. A resilient member is provided to urge the pointer upwardly along its axis of rotation so that in those compass constructions in which a cover is provided the pointer assembly will be urged upwardly against the cover so that the cover will act to retain the pointer in the set position. In those constructions in which there is no cover a clip is provided which snaps over the pointer and onto the compass to hold the pointer in the set position.

The pointer preferably comprises a relatively flat strip of material and is provided with a series of graduations along its axial length and indicia designating portions of time. A member is slidably mounted on the pointer and is movable along the length thereof so that it can be moved to a position which indicates the length of time spent in traveling.

DESCRIPTION OF THE DRAWING

Several preferred embodiments of the present invention will now be described with reference to the accompanying drawing in which like reference characters refer to like parts throughout the several views and in which.

DESCRIPTION OF SEVERAL PREFERRED EMBODIMENTS

Figure 1:
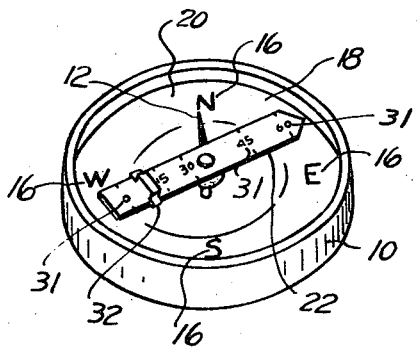
FIG. 1 is a top perspective view of a compass provided with the direction of travel and time indicator of the present invention.
Figure 2:
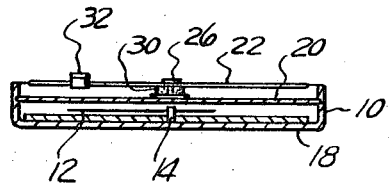
FIG. 2 is a longitudinal cross-sectional view of FIG. 1 taken substantially on a plane containing the longitudinal axis of the indicator and its pivot pin.
Figure 3:
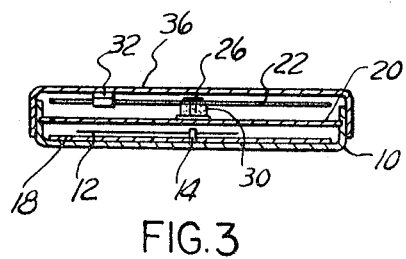
FIG. 3 is a view similar to FIG. 2 but illustrating the compass as including a cover member.

Now referring to the drawings for a more detailed description of the present invention. One preferred compass construction is illustrated in FIGS. 1, 2 and 3 thereof as comprising a base member 10 in which is mounted a magnetic needle 12. The needle 12 is mounted on a pin 14 in the conventional manner and in combination with direction indicia 16 formed on an indicator plate 18 gives an indication of direction in the well known manner. A transparent disc 20 is constructed of glass, plastic or similar material and is mounted in the base 10 to protect the magnetic needle 12. What has been described to the present is a conventional direction indicating compass.

A pointer 22 is mounted to the disc 20 in a manner which will be described in more detail below and is rotatable about an axis substantially parallel to the axis of the pin 14 and is movable about that axis independently of rotation of the needle 12 so that it can be rotated to a position indicating the direction of travel.

Figure 6:
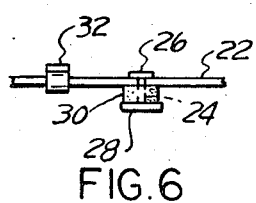
FIG. 6 is an enlarged fragmentary view of the direction of travel and time indicator attachment of the present invention.

Referring to FIG. 6 it can be seen that the pointer 22 is mounted on a pin 24 having an upper flange 26 and a base 28. A resilient member 30 preferably constructed of a light rubber or cushion material is disposed intermediate the base 28 and the pointer 22 and urges the pointer 22 upwardly against the underside of the flange 26. The base 28 is preferably attached to the disc 20 by means of a suitable adhesive applied to the underside of the base 28 so that the pointer 22 can be readily attached to the compass.

Figure 7:
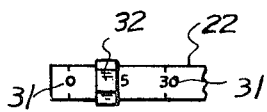
FIG. 7 is an enlarged fragmentary view of a portion of the structure shown in FIG. 1.

As can best be seen in FIGS. 1 and 7 the pointer 22 is graduated along its axial length to provide a plurality of spaced indicia 31 which in this particular embodiment represent portions of an hour of time. A member 32 is mounted on the pointer for slidable movement therealong so that the member 32 can be moved along the pointer and set at or near one of the time indications 31. As can best be seen in FIG. 7 the member 32 is provided with spaced gripping ends 34 which permit the member 30 to be slid past the pin 24 and the resilient member 30.

It is apparent then that the pointer 22 can be rotated about the pin 24 to a position indicating the direction of travel before undertaking a hike into the woods or some other area where there might be a possibility of becoming lost. Once the destination has been reached the time in traveling can be noted and the member 32 moved to the position which indicates the approximate travel time. This will then give an indication of distance traveled and will act as a reminder to insure that the return trip will be started before it becomes too late. Such a device is especially useful in hunting or fishing wherein the hunter or fisherman will walk into a remote area to a spot and may stay there for several hours before returning. When it is time to leave not only is the direction of travel to return indicated but there is also a record of the time spent in getting there so there is little danger of starting out of the woods too late in the day or from walking too far past the starting point.

When the compass is provided with a cover such as the cover 36 illustrated in FIG. 3 which snaps over the base 10 this cover is used to retain the pointer 22 in the set position. As can be seen in FIG. 3 the shank of the pin 24 is sufficiently long to extend a little above the sides of the base 10 so that upon closing the cover 36 the upper surface of the member 32 or pointer 22 is engaged by the cover 36 to thereby maintain the pointer in the set position. The resilient member 30 acts to maintain the pointer assembly in contact with the underside of the cover 36 to aid in the retention of the pointer in the set position.

Figure 4:
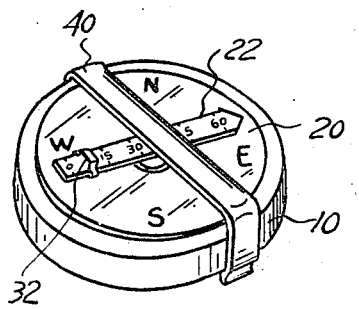
FIG. 4 is a view similar to FIG. 1 but illustrating a clip member for use with a compass not having a cover.
Figure 5:
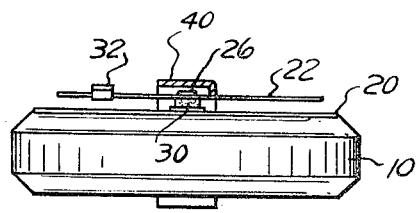
FIG. 5 is a side elevational view of the compass illustrated in FIG. 4.

FIGS. 4 and 5 illustrate a compass construction in which no cover corresponding to cover 36 of FIG. 3 is provided. In such a construction a clip 40 may be provided to snap over the base 10 of the compass and to engage the upper portion of the pointer assembly and thereby retain the pointer 22 in the set position.

It is apparent that an attachment has been described for compasses which can be used to convert ordinary direction indicating compasses to a direction of travel and time elapsed indicating device. In those compasses provided with a transparent cover such as those herein described the assembly can be readily attached by means of a suitable adhesive to such a cover. In those constructions in which there is no apparent cover for protecting the magnetic needle it has been found that the travel indicator assembly can be readily attached by an adhesive to the top of the post supporting the magnetic needle as long as care is taken not to disturb the needle itself.

It is also apparent that although I have described but several embodiments of my invention many other changes and modifications can be made therein without departing from the spirit of the invention as expressed by the scope of the appended claims.

I claim:

1. In combination with a compass having a magnetic pointer for indicating direction; means for indicating the time and direction of march of a user of said compass, said means comprising:
    (a) a second pointer rotatably attached to said compass and being rotatable independent of rotation of said magnetic pointer to provide a means selectively movable to a position indicating the direction of march of the user of said compass,
    (b) resilient means disposed intermediate said compass and said second pointer, and
    (c) a plurality of graduations on said second pointer, said graduations indicating time, and means selectively movable along said second pointer whereby the time of beginning a march can be indicated on said second pointer.

2. The combination as defined in claim 1 and in which said second pointer is positioned above said magnetic pointer and is rotatable about substantially the same axis as said magnetic pointer.

3. The combination as defined in claim 1 and including means for retaining said second pointer in a set position said means comprising a clip member adapted to snap over said second pointer and attach to said compass.

4. The combination as defined in claim 1 and in which said compass is provided with a cover adapted to cover said pointers in a closed position and including means for retaining said second pointer in a set position, said means comprising a resilient member disposed intermediate said compass and said second pointer and urging the assembly comprising said second pointer and said means movable therealong upwardly into contact with said cover when said cover is closed.

5. An attachment for a compass having a magnetic pointer, said attachment comprising:
    (a) a pointer assembly and means for attaching said pointer assembly to said compass, said pointer assembly including a pointer which is rotatable independently of the rotation of said magnetic pointer whereby it can be set to indicate a beginning direction,
    (b) said pointer assembly including indicia displayed longitudinally along said pointer to indicate time, and means selectively movable to a position designating a particular time; and
    (c) resilient means disposed intermediate said compass and said assembly.

6. An attachment for a compass having a magnetic pointer, said attachment comprising:
    (a) a pointer assembly and means for attaching said pointer assembly to said compass, said pointer assembly including a pointer which is rotatable independently of the rotation of said magnetic pointer whereby it can be set to indicate a beginning direction,
    (b) said pointer assembly including indicia displayed longitudinally along said pointer to indicate time, and means selectively movable to a position designating a particular time, and
    (c) said attachment including a pin having a base, said pointer assembly being rotatable about said pin, and said means for attaching said attachment to said compass comprising an adhesive securing said base to said compass.

7. The attachment as defined in claim 6 and including resilient means disposed intermediate said base and said pointer to urge said pointer in a direction away from said base.

8. The attachment as defined in claim 6 and including a clip to be attached over said pointer and said compass to retain said pointer in a set position.

References Cited

UNITED STATES PATENTS

| | | | |
|---|---|---|---|
| 517,029 | 3/1894 | Clausen | 33—224 |
| 972,936 | 10/1910 | Smith | 33—75X |
| 1,848,894 | 3/1932 | Lendvay | 33—75 |
| 2,618,856 | 11/1952 | Sweet | 33—223X |

FOREIGN PATENTS

| | | | |
|---|---|---|---|
| 963,766 | 7/1964 | Great Britain | 33—222 |

ROBERT B. HULL, Primary Examiner

U.S. Cl. X.R.

33—224; 116—124